United States Patent [19]

Neimat et al.

[11] Patent Number: 5,542,087

[45] Date of Patent: Jul. 30, 1996

[54] LINEAR HASHING FOR DISTRIBUTED RECORDS

[75] Inventors: Marie-Anne Neimat, Atherton; Donovan Schnelder, San Francisco, both of Calif.; Witold Litwin, Boulogne, France

[73] Assignee: Hewlett-Packard Company, Palo Alto, Calif.

[21] Appl. No.: 137,871

[22] Filed: Oct. 15, 1993

[51] Int. Cl.$^6$ ................................................ G06F 17/30
[52] U.S. Cl. .................. 395/600; 364/282.4; 364/255.1; 364/DIG. 1
[58] Field of Search .................................. 395/600, 650; 364/DIG. 1, DIG. 2

[56] References Cited

U.S. PATENT DOCUMENTS

| | | | |
|---|---|---|---|
| 4,871,903 | 10/1989 | Carrell | 235/375 |
| 4,922,417 | 5/1990 | Churm et al. | 395/600 |
| 5,006,978 | 4/1991 | Neches | 395/650 |
| 5,032,987 | 7/1991 | Broder et al. | 364/200 |
| 5,199,073 | 3/1993 | Scott | 380/49 |
| 5,210,824 | 5/1993 | Putz et al. | 395/145 |
| 5,210,870 | 5/1993 | Baum et al. | 395/600 |
| 5,287,498 | 2/1994 | Perelman et al. | 395/600 |
| 5,357,630 | 10/1994 | Oprescu et al. | 395/600 |
| 5,379,424 | 1/1995 | Morimoto et al. | 395/600 |

OTHER PUBLICATIONS

"The Fastest LAN Alive", BYTE, Jun. 1992, pp. 70–74.

David DeWitt et al., "Parallel Database Systems: The Future of High Performance Database Systems", Communications of the ACM, Jun. 1992, vol. 3, No. 6, pp. 85–98.

J. Gallant, "FDDI Routers and Bridges Create Niche for Memories", EDN, Apr. 1992, pp. 61–68.

S. F. Ou et al, "High Storage Utilization for Single–Probe Retrieval Linear Hashing", Computer Journal, vol. 34, No. (5), Oct. 1991, pp. 455–468.

Witold A. Litwin et al., "Trie Hashing with Controlled Load", IEEE Trasaction on Software Engineering, vol. 17, No. 7, Jul. 1991, pp. 678–691.

M. Hsue et al., "Concurrent Operations in Linear Hashing", Information Sciences, vol. 51, No. 2, Jul. 1990, pp. 193–211.

(List continued on next page.)

*Primary Examiner*—Thomas G. Black
*Assistant Examiner*—Maria N. Von Buhr

[57] ABSTRACT

A data processing method and apparatus, which generate a correct memory address from a character or digit string such as a record key value, and which is adapted for use in distributed or parallel processing architectures such as computer networks, multiprocessing systems, and the like. The invention provides a plurality of client data processors and a plurality of file servers, each server including at least a respective one memory location or "bucket". The method of the invention includes the following steps: generating the key value by means of any one of the client data processors; generating a first memory address from the key value, the first address identifying a first memory location; selecting from the plurality of servers a server that includes the first memory location; transmitting the key value from the one client to the server that includes the first memory location; and determining whether the first address is the correct address by means of the server. The method of the invention further provides that if the first address is not the correct address then the following steps are performed: generating a second memory address from the key value by means of the server, the second address identifying a second memory location; selecting from the plurality of servers another server, which includes the second memory location; transmitting the key value from the server that includes the first memory location to the other server, which includes the second memory location; determining whether the second address is the correct address by means of the other server; and generating a third memory address, which is the correct address, if neither the first or second addresses is the correct address. The present invention provides fast storage and subsequent searching and retrieval of data records in data processing applications such as database applications.

10 Claims, 6 Drawing Sheets

OTHER PUBLICATIONS

C. Severance et al., "Distributed Linear Hashing and Parallel Projection in Main Memory Databases", Proceeding of the 16th VLDB Conference, Brisbane, Australia, 1990, pp. 674–682.

M. Ouksel et al., "Concurrency in Multidimensional Linear Hashing", Proceedings of the 3rd International Conference on Foundations of Data Organization and Algorithms, Springer–Verlag, Jun. 1989, pp. 233–240.

Nabil I. Hachem et al., "Key–Sequential Access Methods for Very Large Files Derived from Linear Hashing", Fifth International Conference on Data Engineering, 1989, pp. 305–312.

R. J. Enbody et al., "Dynamic Hashing Schemes", ACM Computing Surveys, vol. 20, No. 2, Jun. 1988, pp. 85–113.

Per–Ake Larson, "Dynamic Hash Tables", Communications of the ACM, vol. 31, No. 4, Apr. 1988, pp. 446–457.

Carla S. Ellis, "Concurrency in Linear Hashing", ACM Transactions on Database Systems, vol. 12, No. 2, Jun. 1987, pp. 195–217.

Hans–Peter Kriegel et al., "Multidimensional Order Preserving Linear Hashing with Partial Expansions", International Conference on Database Theory, Springer–Verlag, Sep. 1986, pp. 203–220.

Witold Litwin, "Linear Hashing: A New Tool for File and Table Addressing", IEEE, 1980.

Per–Ake Larson, "Linear Hashing with Partial Expansions", IEEE, 1980.

Witold Litwin, "Virtual Hashing: A Dynamically Changing Hashing", IEEE 1978.

Edward M. Reingold, "Searching", Encyclopedia of Computer Science, Van Nostrand Reinhold, pp. 1185–1191.

LINEAR HASHING FOR DISTRIBUTED RECORDS

BACKGROUND

The present invention is generally directed to data processing and in particular to a data processing method and apparatus for generating a correct memory address from a character or digit string such as a record key.

Computers and computer networks have become so prevalent in modern society that it is easy to take their inner workings for granted. People using a computer, computer users, generally assume that any data entered into the computer or a network of computers will be stored and retrieved in an efficient way. Over the years, researchers have made sophisticated improvements on simple data storage and retrieval schemes that were designed by various data processing pioneers. While these sophisticated improvements have solved many problems, distributed or parallel processing architectures such as computer networks, multi-processing systems, and the like still provide new challenges. As discussed in greater detail later herein, the present invention provides solutions to these new challenges.

One of the simple data storage and retrieval schemes designed by data processing pioneers is known as a basic hashing scheme. The basic hashing scheme has been used in many areas of data processing such as database addressing and data encryption. The basic hashing scheme will now be introduced with reference to the particular example of database addressing.

Data are commonly stored in an organized manner known as a database under control of a data processor. By means of this data processor, a computer user is able to browse or search through the data, or to insert, amend or delete data as required. Although the computer user has no need to be aware of the exact manner in which data are stored, it is important for speed of operation that the data processor is able to locate and retrieve a particular data record as accurately and quickly as possible. In practice, this requires that the data processor is able to locate a desired data record directly, without having to search through the entire store of data.

In general, each data record comprises two sections: a short record key identifying the record, and a remainder of information associated with that key. For example, a particular database may use a person's name as the key to identify a larger portion of data containing further details about that person. For small data records, the entire record may be used as the key. From the information in the key alone, the data processor must be able to find the physical location in the stored data in order to access the data record corresponding to the key. For example, if the data is stored on a magnetic or optical disk, the track and sector address is required before a particular data record can be accessed. In the case of hardware storage in Random Access Memory, RAM, the memory address is required.

A direct key to memory address conversion scheme can be used to deduce a memory address for a particular location for a particular data record. The record's key is converted directly into a numerical key value, which in turn is scaled or otherwise manipulated to produce a data record address lying within the possible range of addresses appropriate to the storage means in use. When the data record is originally stored, it is stored at the address calculated as above from the record's key. Again, if subsequent access to the record is required, the data processor searches for the record at an address calculated from the record's key at the time at which the access is required.

The direct key to memory address conversion scheme just described is fast in operation, however it suffers from a disadvantage that the numerical key values are not usually uniformly distributed across the range of possible numerical key values. For example, if each key is a respective subject's personal name, it is clear that certain character strings of a common last name such as "Jones" will appear many times in the keys, while other character strings such as "ABCDEFG" are extremely unlikely to appear. The direct key to memory address conversion scheme leads to a bunching of data records around groups of adjacent memory addresses, while other memory addresses remain unused. This can lead to very inefficient use of the available storage space. To overcome this inefficiency, the basic hashing scheme is used to calculate a memory address from the record's key.

In accordance with the basic hashing scheme, the data record's key is "hashed", meaning that the record's key is converted into a near-random number by a mathematical function known as a hashing function. The near-random number is then scaled or otherwise manipulated as discussed previously to produce a data memory address lying within the possible range of addresses appropriate to the storage means in use. In accordance with the basic hashing technique, a previously known procedure for storing an individual data record is as follows:

a) The record's key is hashed to produce a near random number. The near random number identifies a data storage location, also known as a data storage "bucket".
  b) The near random number is used in conjunction with a look-up table to obtain a record address of the data storage location.
  c) If the data storage location is not already completely filled with data records, the records are stored in the data storage location.
  d) If however the memory location is full, then what is known as a "collision" occurs. Consequently, the record is stored in a first available space in an overflow data storage location. A pointer is associated with the full memory location to identify an address of the overflow memory location in which the record is stored.

Similarly, when access to the stored record is subsequently required, the following steps are performed:

a) The record's key is again hashed to produce the near-random number.
  b) The near random number is again used in conjunction with a look-up table to obtain the memory address of the data storage location.
  c) The data storage location is searched for the record.
  d) If the record is not found in the memory location, then the address of the overflow memory location is retrieved and the overflow data storage location is searched for the record.

An unfortunate limitation of the basic hashing scheme is that this additional searching of the overflow data storage location may considerably slow down retrieval of the data record.

This limitation was surpassed in 1980 by a researcher named Witold Litwin, who is also a coinventor of the present invention. Litwin avoided creation of any overflow memory locations and associated searching delays by developing a sophisticated improvement upon the basic hashing scheme. Litwin described his improved "linear hashing" scheme in a frequently referenced article published in 1980 in the Proceedings of the 6th International Conference on Very Large Databases at pages 212–223. The article is entitled "Linear Hashing: A New Tool For File And Table Addressing". Numerous benefits provided by the linear hashing scheme are discussed in detail in the article. Because the article provides helpful background information, it is hereby incorporated by reference.

As a simplified brief summary, tile linear hashing scheme employs a central hash table comprising a sequential organization of a first memory location or "bucket", followed by a second data storage location or "bucket", followed by a third memory location or "bucket", and so on up to and including a last memory location of the table numbered, thereby yielding a total number, T, of memory locations. Linear hashing avoids creating and using any overflow memory locations by gradually increasing address space in response to each collision.

Address space is gradually increased in response to each collision by a process of "splitting" a respective predetermined one of memory locations or "buckets". In response to each collision, the respective predetermined memory location or "bucket" is "split" by creating a respective new memory location and moving approximately half of the records from the respective predetermined memory location to the respective new memory location. Splitting the predetermined memory locations or "buckets" takes place in a predetermined order so that the first storage location is split in response to a first collision. Next, the second storage location is split in response to a second collision, and so on, up to and including splitting the last storage location in response to a subsequent collision. A pointer keeps track of the next memory location to be split.

When the total number of memory locations, T, have been "split", the table size is doubled to a new total number of memory locations, 2T, by annexing all of the new data storage buckets and incorporating them at the end of the table. The pointer is reset to zero and the splitting process begins over again in a similar manner as discussed previously herein. With each subsequent collision, the pointer is incremented to track the next storage location to be split. The memory locations are once again split in sequential order, once again doubling the table size, yielding another new total number of storage locations, 4T. In accordance with such linear expansion principles, the table continues expanding as long as required.

The linear hashing scheme provides many advantages, however new challenges are created by multiprocessing systems. While an aggregate performance and memory size of a multiprocessing system is very high, the central hash table prevents the distributed processor architecture from achieving high levels of performance using the linear hashing scheme. A partial solution is provided by a distributed linear hashing scheme proposed in an article entitled "Distributed Linear Hashing And Parallel Projection In Main Memory Databases" by C. Severence et al, published in 1990 in the Proceedings of the Sixteenth International Conference on Very Large Data Bases, pages 674–682. Because this article provides helpful background information, it is hereby incorporated by reference. Severence et al. propose using the distributed linear hashing scheme on a tightly coupled multi-processor computer with a shared memory, known as a NUMA architecture multi-processor system.

The distributed linear hashing scheme employs many of the expansion principles of the linear hashing scheme. However, instead of using the central hash table of the linear hashing scheme, the distributed linear hashing scheme provides that each memory location or "bucket" includes a respective hash directory. Records are located by using the hash directories in conjunction with local file parameters called Local_M and stored in a respective cache memory of each processor. Another file parameter called Global_M accurately represents a current total number of memory locations or "buckets" in the shared memory, while the Local_M parameters may or may not accurately represent the current total number of storage location in the shared memory. When any processor doubles the number of memory locations in accordance with the expansion principles of linear hashing discussed previously herein, the processor updates the file parameter called Global_M by doubling Global_M. As discussed on the first full paragraph of page 677 of the Severence article, the processor updating Global_M must also update all of the copies of Local_M in all of the other processors. Such global update requirements limit system efficiency, especially as the multi-processor computer is scaled up to include a very large number of processors. It should be particularly noted that simultaneous global updates to all processors require that all processors are simultaneously available, thereby precluding any continuous autonomy of the processors.

Currently, more and more data base applications are mission critical and require fast storage and subsequent searching, and retrieval of unpredictably large amounts of incoming data. Database operations such as storing records, searching for records and retrieving records all require generating a correct memory address from a record key value. Accordingly, what is needed is a flexible and efficient data processing method and apparatus, which generates a correct memory address from a character or digit string such as a record key value, and which is adapted for use in distributed or parallel processing architectures such as computer networks, multiprocessing systems, and the like.

SUMMARY OF THE INVENTION

The present invention provides a flexible and efficient data processing method and apparatus, which generate a correct memory address from a character or digit string such as a record key value, and which is adapted for use in distributed or parallel processing architectures such as computer networks, multiprocessing systems, and the like. The present invention provides fast storage and subsequent searching and retrieval of data records in data processing applications such as database applications.

In accordance with the teachings of the present invention, a database is created in a distributed environment from records provided by any number of distributed and autonomous clients. Records of the database are stored at memory locations or "buckets" provided by file servers. In accordance with a preferred embodiment of the present invention, a number of servers is large, for example in a range of 10 to 10,000 servers. The large number of servers provide a memory pool that offers many gigabytes of random access memory, RAM, perhaps even terabytes, and even more bytes of disk space memory.

At any given time, a number of records provided by the clients is unpredictable, and can be much larger than what a single memory location or "bucket" can accommodate. The servers are coupled, preferably by a network, so that each server can send records to other servers. By practicing the present invention in conjunction with a high performance computer network, database operations are much faster than a traditional single site disk based system, and hold a much larger number of records.

The plurality of clients are coupled to the file servers by the network to provide client access to the database. In general, there is no need for any client to communicate with any other client. However, in accordance with the principles of the invention a client can also function as a file server. Since the clients are autonomous, it is uncertain whether they would ever be simultaneously available for any global parameter updates. It should be particularly noted that the method of the present invention avoids any reliance upon any simultaneous global parameter updates, thereby maintaining autonomy of the clients and avoiding difficulties inherent in the prior art. As records are inserted into the database by the clients, the addressable storage space available to the database expands so that records reside on virtually any number of servers. The addressable storage space available to the database expands linearly, one memory location or "bucket" at a time, to a size limited only by data storage capacity of the servers. Accordingly, addressable storage space available to the database expands to occupy new servers linearly, one server at a time, and only when servers already used are efficiently loaded.

If any one of the clients initiates a database operation such as inserting a record into the database, searching the database to determine whether a particular record are present, or retrieving a record, the client initiating the operation provides a record key value. From the record key value, the method of the present invention provides a correct memory address needed to perform the database operation.

Briefly and in general terms, the data processing method of the present invention includes providing a plurality of client data processors and a plurality of file servers, each server including at least a respective one memory location or "bucket". The key value is generated by means of any one of the client data processors. From the key value, the one client generates a first memory address, which identifies a first memory location or "bucket". The one client selects from the plurality of servers a server that includes the first memory location. The one client then transmits the key value as part of a message to the server that includes the first memory location.

The server that includes the first memory location determines whether the first address is the correct address. Often the first address is the correct address. However, if the first address is not the correct address, then the following steps are performed in accordance with the method of the present invention.

From the key value, the server that includes the first memory location generates a second memory address, which identifies a second memory location or "bucket". The server that includes the first memory location then selects from the plurality of servers a server that includes the second memory location. The server that includes the first memory location then transmits the key value as part of a message to the server that includes the second memory location.

The server that includes the second memory location determines whether the second address is the correct address. Quite often, if the first address is not the correct address then the second address is the correct address. However, if the second address is not the correct address, then the server that includes the second memory location generates a third memory address. In accordance with the teachings of the present invention discussed greater detail later herein, the third address is certain to be the correct address if neither one of the first or second addresses is the correct address.

A computing apparatus of the present invention, preferably a network of computers, is programmed to perform the method of the present invention. Preferably, clients and file servers are computers that are nodes of the network. However, there are alternative embodiments of the computing apparatus of the present invention. For example in one alternative embodiment the clients and file servers are processors, each coupled to a respective local random access memory, RAM, within a multiprocessing machine. The present invention is especially useful for very large databases where the distribution of records over several sites is advantageous for exploiting parallelism.

It should be particularly noted that the present invention avoids using a typical master site of the prior art that memory address computations must go through to perform operations such as accessing a centralized directory. Accordingly, the principles of the present invention are distinctly different from those of classical data structures that are modified in a trivial way, such as by using an extendible hash record with a directory on one site and data records stored on other sites. For very large databases, the invention is more efficient than traditional database systems that use a centralized directory, or a static parallel or distributed hash record.

The present invention provides efficiency by reducing message transmissions through the network, while maximizing server storage loading. Inserting a record into the database usually requires one message, two or three in the worst case (excluding splits). For very large numbers of memory storage locations, the efficiency of the present invention is superior to that achieved by a traditional database system using a centralized directory or a master site. Reducing messages needed to perform database operations also provides enhanced reliability. Additionally, the present invention advantageously avoids a large centralized directory, which is an impedance to creating a very large database of distributed records. The present invention accommodates any number of clients and servers, and allows the database storage to extend to occupy any number of servers.

Other aspects and advantages of the present invention will become apparent from the following detailed description, taken in conjunction with the accompanying drawings, illustrating by way of example the principles of the invention.

DETAILED DESCRIPTION OF THE PREFERRED EMBODIMENT

The present invention provides a flexible and efficient data processing method and apparatus, which generates a memory address from a character or digit string such as a record key, and which is adapted for use in distributed or parallel processing architectures such as computer networks, multiprocessing systems and the like. As discussed in greater detail later herein, the present invention is advantageously applied to data processing applications such as database applications, to provide fast storage and subsequent searching, and retrieval of unpredictably large amounts of incoming data. A traditional database architecture deals with data records through a single processor and a relatively small amount of main random access memory, RAM, with a relatively large amount of local disk memory as secondary storage. In contrast, a preferred embodiment of the present invention is used in conjunction with a computer network.

Figure 1:
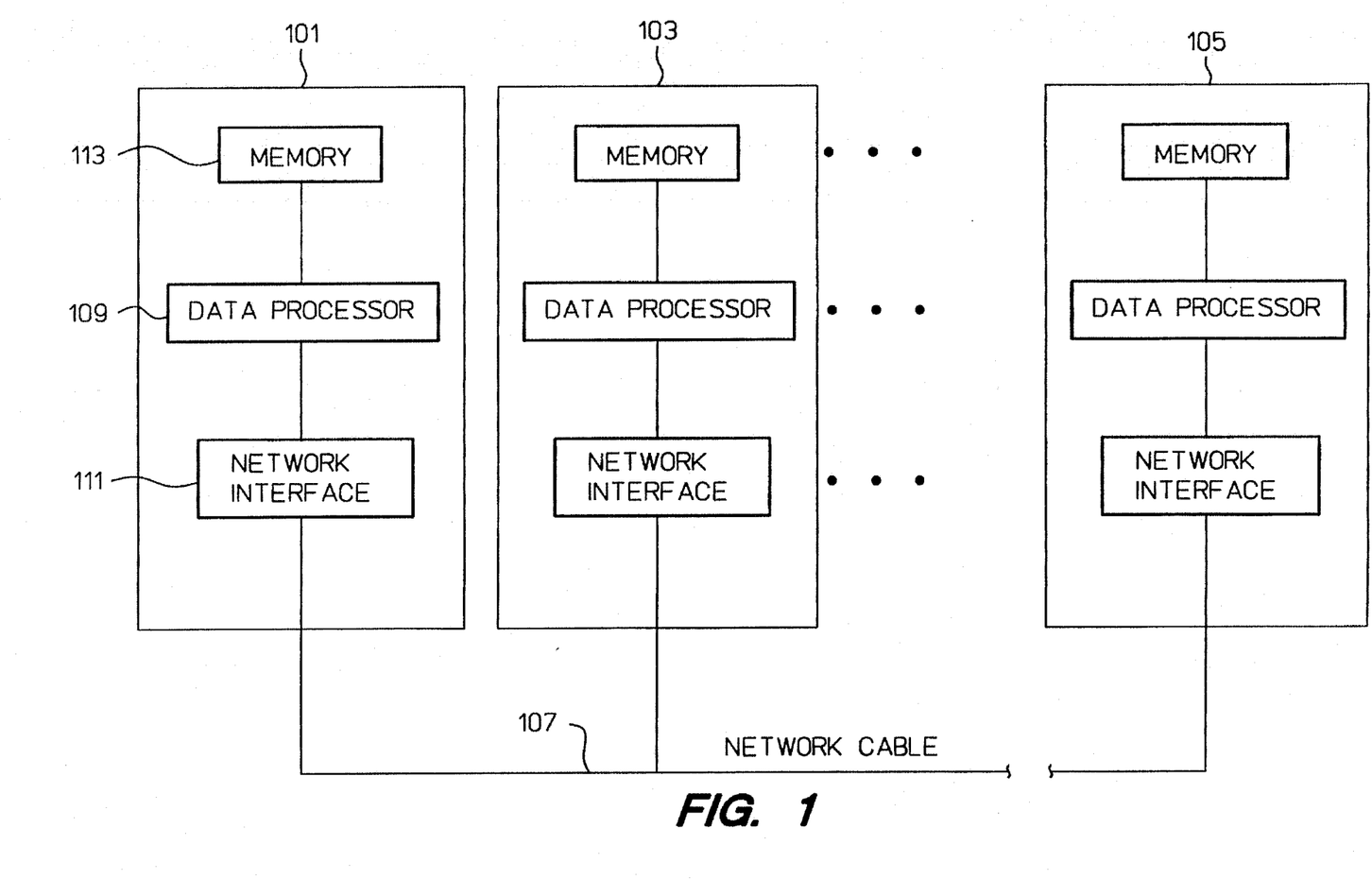
FIG. 1 is a simplified block diagram of a computer network of the preferred embodiment of the apparatus of present invention.

The computer network includes a plurality of data processor sites coupled so as to provide high speed data communication between the processor sites. FIG. 1 is a simplified block diagram of the computer network employed in conjunction with the preferred embodiment of the present invention. In accordance with a preferred embodiment of the present invention, a number of processor sites is large, for example in a range of 10 to 10,000 servers. It should be understood that although in the preferred embodiment the network includes the large number of processor sites, only three processor sites 101, 103, 105, are shown in FIG. 1 for the sake of simplicity. The processor sites are interconnected, preferably by a network cable 107, to provide the data communication between the processor sites. A first one of the processor sites includes a data processor 109, preferably a microprocessor, coupled to the network cable 107 through a network interface 111. The first one of the processor sites further includes memory 113, preferably random access memory, RAM, coupled to the data processor 109. As shown in FIG. 1, remaining processor sites 103, 105 include similar components, arranged in a similar manner, as those discussed with respect to the first processor site.

Performance of the traditional data base architecture is limited by data communication speeds of magnetic or optical disk storage technologies. In contrast, the preferred embodiment advantageously employs the high speed data communications provided by the computer network. For example, ethernet cable and network interfaces achieve data communication speed of 10 Megabits per second, Mb/sec. As another example, FDDI or TCNS cable and network interfaces achieve data communication speed of 100 Mb/sec. As yet another example, Ultranet or HPPI cable and interfaces achieve data communication speed of 100 Mb/sec to 1,000 Mb/sec. Such data communication speeds cannot be achieved using disks, because of physical limits on the magnetic and optical disk storage technologies.

A database is a collection of records stored in memory locations or "buckets". In accordance with distributed processing principles of the preferred embodiment, data records reside in memory locations at sites of the network. For storing records, it is more efficient to use memory locations in random access memory, RAM, of another processor site of the network than to use memory locations in a local disk. Accordingly, in the preferred embodiment, storage of records is distributed in RAM at various network sites, providing efficient performance of very large database operations that are not feasible in practice within the traditional database architecture.

The computer network provides for a pooling of processing and memory resources, providing more processing and memory resources than are available in the traditional architecture. In accordance with the principles of the invention, hundreds, or even thousands of sites, with dozens of megabytes, Mb, of RAM per site, and even more of disk space, are interconnected. This provides for databases of records that are distributed in RAM reach and gigabytes, Gb, in size.

Data records are stored under control of the data processor sites, which are further distinguished herein as client data processor sites and file server sites. The database is created in a distributed environment from records provided by any number of distributed and autonomous client data processors. Records of the database are stored at memory locations or "buckets" provided by file servers. As records are inserted into the database by the clients, the addressable storage space available to the database expands so that records reside on virtually any number of servers. The addressable storage space available to the database expands linearly, one memory location or "bucket" at a time, to a size limited only by data storage capacity of the servers. Accordingly, addressable storage space available to the database expands to occupy new servers linearly, one server at a time, and only when servers already used are efficiently loaded.

By means of one of the client sites interacting with the server sites, a computer user is able to browse or search through the data records, or to insert, or retrieve data records as required. Although the computer user has no need to be aware of the exact manner in which data are stored, it is important for speed of operation that the clients and servers are able to locate and retrieve a particular data record as accurately and quickly as possible. In practice, this requires that the client and server sites interact to locate a desired data record in a fashion that is more direct than having to search through the entire database.

In general, each data record comprises two sections: a short record key identifying the record, and a remainder of information associated with that key. For example, a particular database may use a person's name as the key to identify a larger portion of data containing further details about that person. As a specific example, in a medical database application, ASCII character values of a patient's name, such as Janet Jones, are scaled or otherwise manipulated to produce a key value, which identifies a larger portion of data containing details about the patient, such as details concerning medical treatment history. From the information in the key value alone, the client site interacts with the server sites, finding the location of the stored data record in order to access the data record corresponding to the key value. For example, if the data is stored in Random Access Memory, RAM, the physical memory address is required. Preferably, memory locations are in RAM, although they could alternatively be on disk as well. In the case of storage on a magnetic or optical disk, the track and sector address is required before a particular data record can be accessed.

Figure 2:
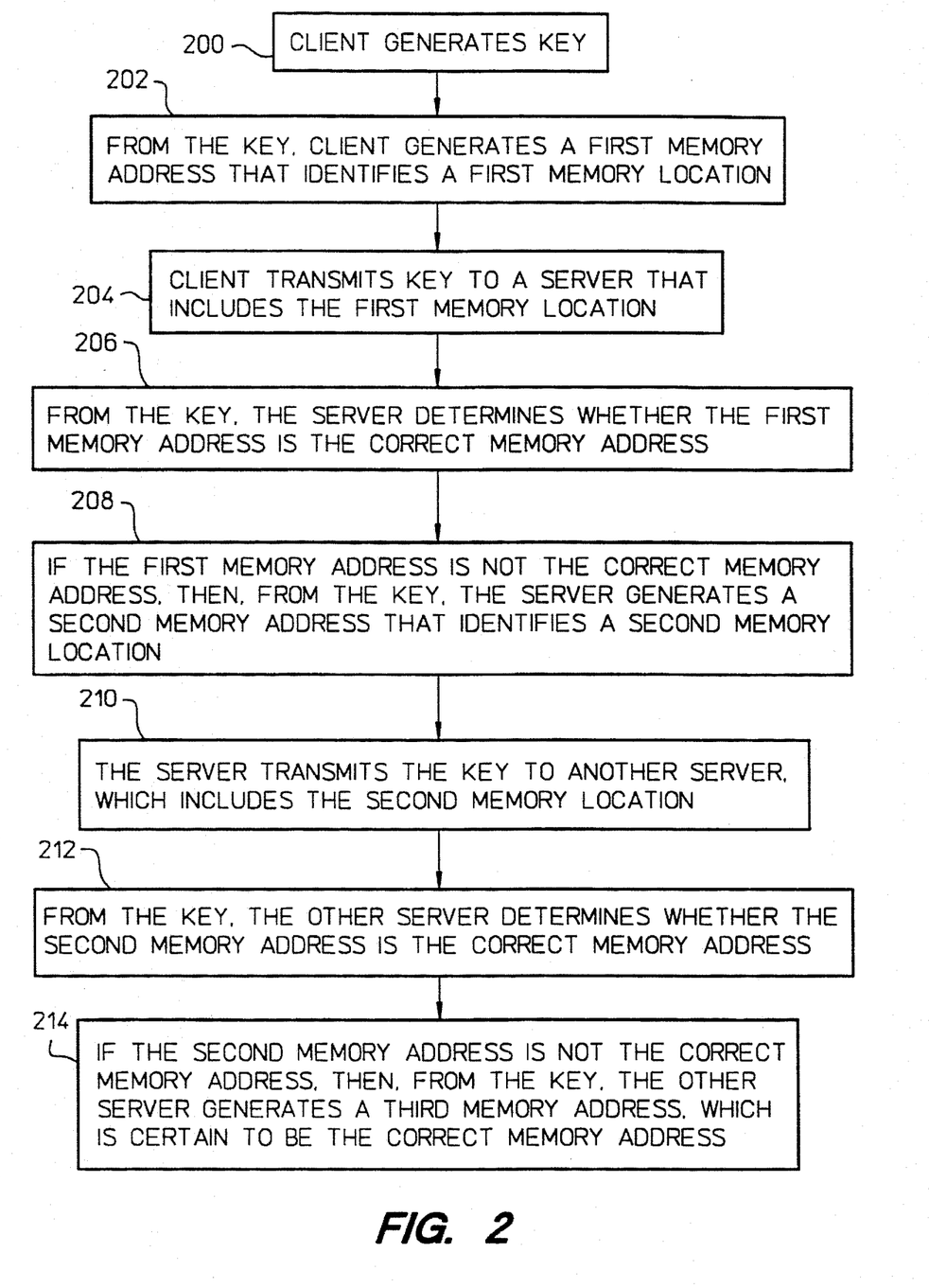
FIG. 2 is a flow chart illustrating a preferred embodiment of the data processing method of the present invention

FIG. 2 is a flow chart further illustrating a preferred embodiment of the data processing method of the present invention for generating a correct memory address from a record key value. As discussed previously, a plurality of client data processors and a plurality of file servers are provided. Each server includes at least a respective one memory location. Any one of the client data processors is selected to generate a key value, C, as discussed previously and as shown in block 200 of the flow chart of FIG. 2.

From the key value, the one client processor generates a first memory address that identifies a first memory location as shown in block 202. The step of generating the first address includes the one client data processor retrieving a client index value, i', which is stored in a client memory coupled to the one client data processor. The one client data processor hashes the key value using a hashing function based upon the client index value, i', so as to produce the first address, $a_1$. In the preferred embodiment, the client data processor uses a division hashing function so that the first address, $a_1$, is expressed by the following equation:

$$a_1 = h_{i'}(C) = C \bmod N*2^{i'}$$

where $h_{i'}()$ is functional notation for the hashing function based upon the client index value, C is the record key value, N is an initial number of memory locations available for record storage before any expansion of the addressable storage space, i' is the client index value, and rood indicates standard modulus function notation. While it is preferred that division hashing functions be consistently employed here and elsewhere in the invention, it should be understood that the present invention is not strictly limited to division hashing functions since alternative hashing functions can be used. For example, as an alternative, multiplication hashing functions may be consistently employed in the invention with beneficial results.

In accordance with the principles of the invention the one client data processor retrieves a pointer value n' stored in the client memory. The one client data processor compares the client pointer value to the first memory address so as to determine whether the first memory address is less than the client pointer value.

If the first memory address is less than client pointer value, $a_1 < n'$, then the one client data processor increments the client index value, i', to produce an incremented client index value, i'+1, hashes the key value using a hashing function based upon the incremented client index value so as to produce an alternative hash value and changes the first memory address so as to be equal to the alternative hash value. Accordingly, if the first memory address is less than the client pointer value, then the first memory address is changed to be expressed as follows:

$$a_1 = h_{i'+1}(C) = C \bmod N*2^{i'+1}$$

where $h_{i'+1}(C)$ is the alternative hashing value, C is the record key value, N is the initial number of memory locations available for record storage before any expansion of the addressable storage space, i'+1 is the incremented client index value, and rood indicates standard modulus function notation.

Using the first memory address, the client data processor selects from the plurality of servers a server that includes the first memory location. Preferably, the client memory stores a static table which maps a respective memory address of each memory location to a respective server address. Alternatively, some other mapping means such as a dynamic table may be employed. Preferably, the one client data processor looks up the first memory address in the table to select from the plurality of servers the server that includes the first memory location. Over the network, the one client data processor transmits the key value to the server that includes the first memory location, as shown in block 204 of the flow chart of FIG. 2.

From the key value, the server determines whether the first memory address is the correct memory address, as shown in block 206. In the preferred embodiment, the step of determining whether the first address is the correct address includes retrieving a first server index value, J, from the first memory location, hashing the key value using a hashing function based upon the first server index value to produce a first hash value, and comparing the first address to the first hash value to determine whether the first address is the correct address. The first hash value is generated by the server in accordance with the following equation:

$$h_1(C) = C \bmod N*2^J$$

where $h_1(C)$ is the first hash value, C is the record key value, N is the initial number of memory locations available for record storage before any expansion of the addressable storage space, J is the first server index value in the context of this equation, and mod indicates standard modulus function notation. The server compares the first address $a_1$ to the first hash value $h_1(C)$. If the first address, $a_1$, is equal to the first hash value, then the server determines that the first address is the correct address. If the first address, $a_1$, is not equal to the first hash value, then the server determines that the first address is not the correct address.

If the first memory address is not the correct memory address, then, from the key value, the server generates a second memory address, $a_2$, that identifies a second memory location, as shown in block 208 of the flow chart of FIG. 2. The step of generating the second address by means of the server includes: making the second address, $a_2$, equal to the first hash value, $h_1(C)$; decrementing the first server index value, J, to produce a decremented first server index value, J−1; hashing the key value using a hashing function based upon the decremented first server index value to produce a second hash value, $h_2(C)$; and changing the second address so as to be equal to the second hash value if the second hash value is greater than the first address, and if the second hash value is less than the first hash value. The second hash value is generated by the server in accordance with the following equation:

$$h_2(C) = C \bmod N*2^{J-1}$$

where $h_2(C)$ is the second hash value, C is the record key value, N is the initial number of memory locations available for record storage before any expansion of the addressable storage space, J−1 is the decremented first server index value in the context of this equation, and mod indicates standard modulus function notation. The server compares the second hash value, $h_2$, to the first address $a_1$ and compares the second hash value $h_2$ to the first hash value, $h_1$. If the second hash value is greater than the first address, $h_2 > a_1$, and if the second hash value is less than the first hash value, $h_2 < h_2$, then the server changes the second address so as to be equal to the second hash value, $a_2 = h_2$. Otherwise, the second address remains unchanged and equal to the first hash value, $a_2 = h_1$. This process prevents the server from ever generating an address that is beyond current available address space.

Using the second memory address, the server selects from the plurality of servers another server, which includes the second memory location. In the preferred embodiment, the first memory location stores a static table which maps a respective memory address of each memory location to a respective server address. Accordingly, the server looks up the second memory address in the table to select from the plurality of servers the other server, which includes the second memory location. Over the network, the server transmits the key value to the other server, which includes the second memory location, as shown in block 210 of the flow chart of FIG. 2.

In a similar manner as discussed previously with respect to the server that includes the first memory location, the other server uses the key value to determine whether the second memory address is the correct memory address, as shown in block 212. The step of determining whether the second address is the correct address includes retrieving a second server index value from the second memory location, hashing the key value using a hashing function based upon the second server index value to produce a third hash value, and comparing the second address to the third hash value to determine whether the second address is the correct address. It should be understood that the first server index value is distinct form the second server index value and that the second server index value may or may not be equal to the first server index value. However, because of symmetry considerations and a desire to limit use of subscripts in describing the method of the invention, the letter J used previously herein to represent the first server index value is used again here, but to represent the second server index value, J. The third hash value is generated by the server in accordance with the following equation:

$$h_3(C) = C \bmod N*2^J$$

where $h_3$ (C) is the third hash value, C is the record key value, N is the initial number of memory locations available for record storage before any expansion of the addressable storage space, J is the second server index value in the context of this equation, and mod indicates standard modulus function notation. The server compares the second address $a_2$ to the third hash value $h_3$ (C). If the second address, $a_2$, is equal to the third hash value, then the other server determines that the second address is the correct address. If the second address, $a_2$, is not equal to the third hash value, then the other server determines that the second address is not the correct address.

If the first memory address is not the correct memory address, then, from the key value, the other server generates a third memory address, $a_3$, that identifies a third memory location, as shown in block 214 of the flow chart of FIG. 2. The step of generating the third address by means of the other server includes: making the third address, $a_3$, equal to the third hash value, $h_3$ (C); decrementing the second server index value, J, to produce a decremented second server index value, J−1; hashing the key value using a hashing function based upon the decremented second server index value to produce a fourth hash value, $h_4$ (C); and changing the third address so as to be equal to the fourth hash value if the fourth hash value is greater than the second address, and if the fourth hash value is less than the third hash value. The fourth hash value is generated by the server in accordance with the following equation:

$$h_4(C) = C \bmod N*2^{J-1}$$

where $h_4$ (C) is the fourth hash value, C is the record key value, N is the initial number of memory locations available for record storage before any expansion of the addressable storage space, J−1 is the decremented second server index value in the context of this equation, and rood indicates standard modulus function notation. The other server compares the fourth hash value, $h_4$, to the second address $a_2$ and compares the fourth hash value $h_4$ to the third hash value, $h_3$. If the fourth hash value is greater than the second address, $h_4 > a_2$, and if the fourth hash value is less than the third hash value, $h_4$ $h_3$, then the other server changes the third address so as to be equal to the fourth hash value, $a_3=h_4$. Otherwise, the third address remains unchanged and equal to the third hash value, $a_3=h_3$. The third address so generated by the other server is certain to be the correct address, if neither the first or second is the correct address.

Figure 3A:
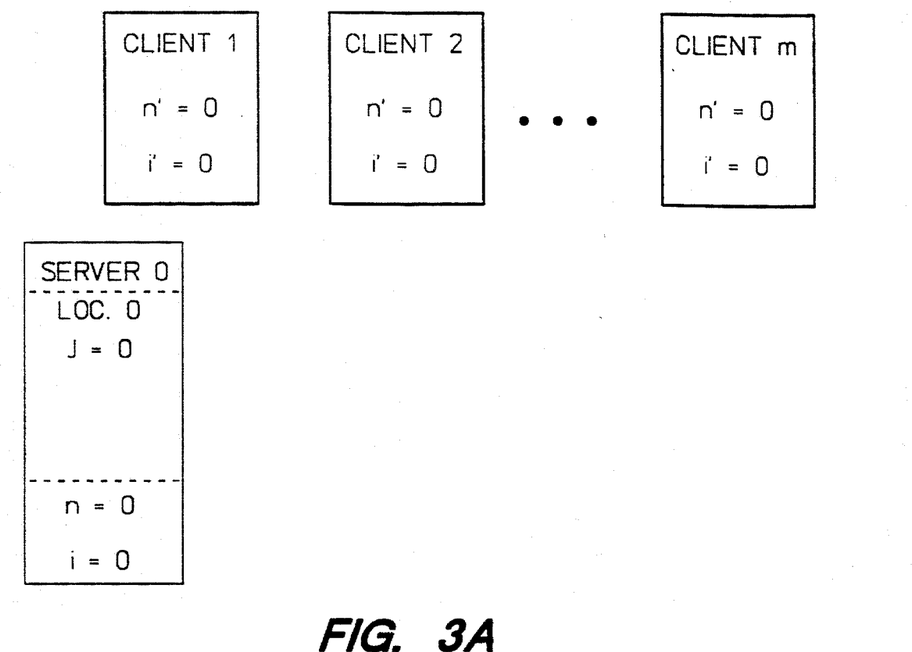
FIGS. 3A through 3E are simplified block diagrams illustrating creation of a database and evolution of the database.

FIGS. 3A through 3E are simplified block diagrams illustrating exemplary creation of the database and evolution of the database as records are inserted into the database in accordance with the method and apparatus of the present invention. The plurality of client data processors are representatively shown in FIGS. 3A through 3E as a first client, client 1, a second client, client 2, and so on up to and including a last client, client m. Each client has a respective memory coupled thereto, for storing a respective client index value, i', and a respective client pointer value, n'. FIG. 3A is a simplified block diagram illustrating an initial state of the computer network when the database is created. As shown in FIG. 3A, for each of the clients, the respective client index value is initially equal to zero, i'=0, and the respective client pointer value is also set equal to zero, n'=0. Additionally, for each of the servers, a respective server pointer is initially equal to zero, J=0.

As indicated previously, in accordance with principles of the present invention, the database is the collection of data records stored in memory locations or "buckets" provided by file servers. For the sake of simplicity in the following discussions, it is assumed that each file server site includes a respective one memory location or "bucket". However, the present invention is not strictly limited to the respective one memory location at each file server site since the invention can be alternatively practiced with more than one respective memory location at each file server site. Each memory location or "bucket" has a respective sequentially numbered address, and each server has a respective sequentially numbered address, for example: memory location 0 and server 0, memory location 1 and server 1 . . . and so on to a last memory location and server.

As shown in FIG. 3A, it is preferred that the database storage space initially includes a single memory location 0, which is included in server 0. Accordingly, in the preferred embodiment, one is the initial number of memory locations available for record storage before any expansion of the addressable storage space, so N=1. Since memory location 0 is not initially completely filled with data records, records initially provided by the autonomous clients are stored in memory location 0. If any one of the clients inserts a record into the database, the one client generates a key value of the record, the correct address is generated from the key value in accordance with the method of the invention discussed previously herein with respect to the flow chart of FIG. 2, and the record is stored at a memory location identified by the correct address. For example, client 2 inserts a record into the database by generating a key value of 10, generating the correct memory address of Location 0, and storing the record in location 0, which resides on Server 0. Specifically, in accordance with block 202 of the flow chart, the client data processor uses a division hashing function based upon the client index value, so that the first address, $a_1$, that identifies a first memory location is expressed by following equation:

$$a_1 = h_{i'}(C) = C \bmod N*2^{i'}$$

where the record key value is C=10, the initial number of memory locations available for record storage before any expansion of the addressable storage space is N=1, and the client index value of Client 2 is i'=0. Accordingly, upon substituting appropriate values, the equation simplifies to:

$$a_1 = 10 \bmod 1 = 0$$

Client 2 compares the client pointer value n'=0, to the first memory address $a_1=0$ so as to determine whether the first memory address is less than the client pointer value. Since 0 is not less than 0, Client 2 does not change the first memory address. Furthermore, since the first address, $a_1$, is zero, the first memory location identified by the first address is Location 0, and Location 0 resides at Server 0, Client 2 transmits the key value, C=10, to Server 0, in accordance with block 204 of the flow chart of FIG. 2.

From the key value, Server 0 determines that the first address is the correct address in accordance with block 206 of the flow chart of FIG. 2. Specifically, Server 0 generates a first hash value using the equation:

$$h_1(C)=C \bmod N*2^J$$

where the first hash value is $h_1(C)$, the record key value is C=10, N is 1 as discussed previously, and the server index value in the context of this equation is J–0. Accordingly, upon substituting appropriate values, the equation simplifies to:

$$h_1(C)=10 \bmod 1=0$$

Server 0 compares the first address, $a_1=0$, to the first hash value, $h_1(C)=0$, and since they are equal to one another, determines that the first address is the correct address.

If memory location 0 becomes full, then what is known as a "collision" occurs. Collisions are well known to those with ordinary skill in the art. In accordance with the invention, address space of memory locations available for storage is gradually increased as needed by a process of "splitting" a respective predetermined one of the memory locations or "buckets". In response to each collision, the respective predetermined memory location or "bucket" is "split" by creating a respective new memory location, and moving approximately half of the records from the respective predetermined memory location to the respective new memory location. Splitting the predetermined memory locations or "buckets" takes place in a predetermined order so that the first memory location 0 is split in response to a first collision. Next, the second storage location is split in response to a second collision, and so on, up to and including splitting the last storage location in response to a subsequent collision.

One of the servers is designated as a split coordinator server. For the sake of this discussion only, it is assumed that Server 0 is the designated split coordinator server. A coordinator pointer value, n, and a coordinator index value, i, are maintained in memory at the designated split coordinator server, which is Server 0. As illustrated in FIGS. 3A through 3E, the coordinator index value, i, provides a helpful accurate boundary indication that a current total number of addressable memory locations is greater than or equal to $2^i$ and is less than $2^{i+1}$. As further illustrated in FIGS. 3A though 3E, the coordinator pointer value, n, accurately identifies the predetermined memory location to be split in response to the next collision. As shown in FIG. 3A, the coordinator pointer value is initially equal to 0, n=0, accurately showing that memory location 0 is to be split upon the first collision. As shown in FIG. 3A, the coordinator index is initially equal to 0, i=0, accurately showing that the current total number of addressable memory locations, which is one memory location, is greater than or equal to $2^0$ and is less than $2^1$. An accurate current total number of addressable memory locations is computed by $2^i$ plus n.

It should be briefly noted that for each of the clients, the respective client index value i' is initially equal to the coordinator index value, and the respective client pointer value n' is initially equal to the coordinator pointer value, n. Accordingly, for each of the clients, the respective client index value i' initially represents an accurate boundary on the current total number of addressable memory locations, and the respective client pointer value, n,' initially represents with accuracy the next memory location to be split. As will be discussed in greater detail later herein, the various client pointer values and client index values do not always accurately represent a-current true status of the memory locations as subsequent records are inserted and the addressable memory space available for storage expands. However, in accordance with the principles of the invention, if any one of the clients generates an incorrect first address based upon a client index value or a client pointer value that do not accurately reflect the current true status of the memory locations, then the server determines that the first address is not the correct address in accordance with the method discussed previously herein with respect to the flow chart of FIG. 2. In a process referred to herein as image update, the client index value and the client pointer value of the one client are locally updated by the server, so as to more accurately reflect the current true status of the memory locations.

Figure 3B:
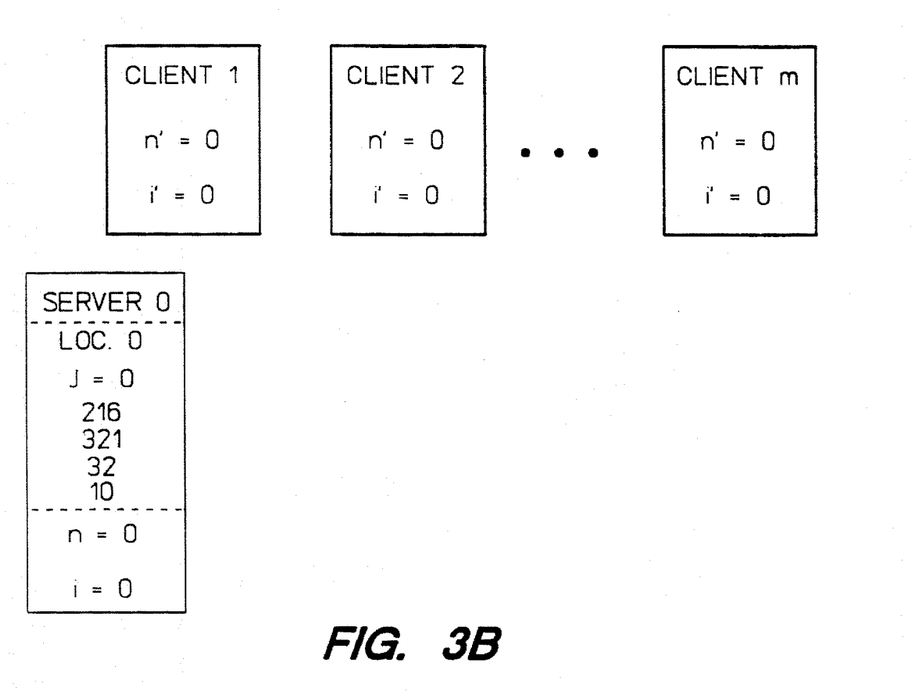

As further exemplary illustration in FIG. 3B, the clients insert four records into the database by generating key values of 10, 32, 321, and 216, generating the correct memory address of Location 0, and storing the records in Location 0. Accordingly, FIG. 3B shows four data records stored in Location 0.

The addressable storage space available to the database expands linearly, one memory location or "bucket" at a time, to a size limited only by data storage capacity of the servers. Accordingly, addressable storage space available to the database expands to occupy new servers linearly, one server at a time, and only when servers already used are efficiently loaded. For the purposes of this discussion only, it is assumed that each of the data locations has a storage capacity of four records. Accordingly, location 0 has become full and a "collision" occurs if there is an attempt to store a fifth record at location 0. For the sake of this discussion only, it is assumed that one of the Clients provides the fifth record, which has a key value, C=153, and which triggers the collision.

In a general case, the split coordinator server receives a collision message over the network from a server that includes a memory location that undergoes a collision. In response to the collision message, the split coordinator server transmits a split message to a target server that includes the predetermined memory location identified by the coordinator pointer value, n. It should be understood that in a specific case of Server 0 being both the split coordinator server and the target server, such transmissions are unnecessary. In response to the split message, it is preferred that the target server performs the following steps sequentially:

a) retrieves the server pointer value, J, from the predetermined memory location;

b) generates a new memory location address equal to $2^J$ plus the coordinator pointer value, n, which identifies a new memory location residing on a new server;

c) hashes the key values of the records stored in the predetermined memory location using a hashing function $h_{J+1}(C)=C \bmod N*2^{J+1}$ to yield a plurality of hash values each corresponding to a respective one of the records;

d) compares the hash values to the new memory location address;

e) for each hash values that is equal to the new memory location address, the target server transmits the records corresponding to these hash values to the new server, for the purpose of storing them in the new memory location;

f) updates the server pointer value so as to be incremented by 1, J:=J+1, and transmits the updated server pointer value to the new server to be stored in the new memory location;

g) sends a commit message to split coordinator server.

Step g) allows the split coordinator to serialize the visibility of splits. This is necessary for the correctness of image adjustment, which is discussed in greater detail later herein. If splits were visible to a client out of sequence, the client could compute a memory address that would be, for the time being, beyond the address space of available memory locations.

The split coordinator server performs the following steps: increments the coordinator pointer value to produce an incremented coordinator pointer value, n+1; compares the incremented coordinator pointer value to $2^i$; if $2^i$ is greater than the incremented coordinator pointer value, $2^i$>n+1, then the coordinator pointer value is updated so as to be equal to the increment coordinator pointer value; otherwise, if $2^i$ is less than or equal to the incremented coordinator pointer value, $2^i \leq n+1$, then the coordinator pointer value is updated so as to be equal to zero and the coordinator value is updated so as to be incremented by 1, i:=i+1.

Figure 3C:
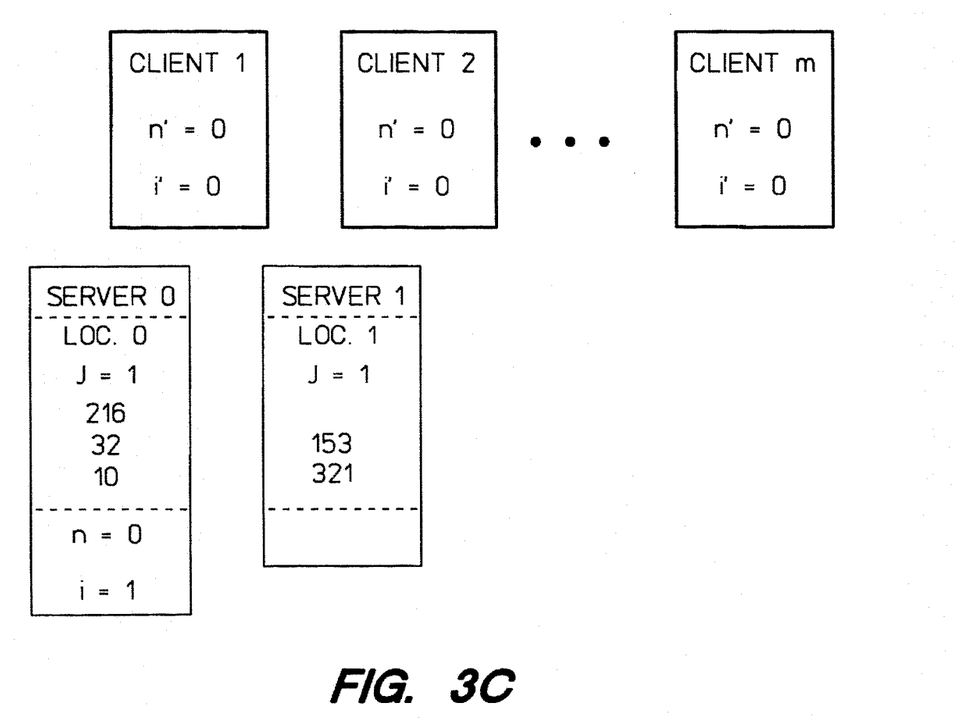

In response to the first collision, Location 0 is split and the address space of available storage locations is expanded to include new Location 1, which resides on new Server 1, in accordance with step a) just discussed. FIG. 3C shows Location 0 split and new Location 1. As shown in FIG. 3C, server pointers of Server 0 and Server 1 are each updated in accordance with step f) just discussed. As further shown in FIG. 3C, records having key values of 153 and 321 are moved from Location 0 to new Location 1, in accordance with steps c), d), and e) just discussed. As further shown in FIG. 3C, the coordinator index value, i, is updated.

In FIG. 3C the coordinator index value, i, is equal to 1, i=1, accurately indicating that the current total number of addressable memory locations (two memory locations) is greater than or equal to $2^1$ and is less than $2^2$. In contrast, the various client index values shown in FIG. 3C do not accurately represent a current true status of the memory locations. Specifically, the various client index values are equal to zero, i'=0, incorrectly indicating that the current total number of addressable memory locations is greater than or equal to $2^0$ and is less than $2^1$.

Figure 3D:
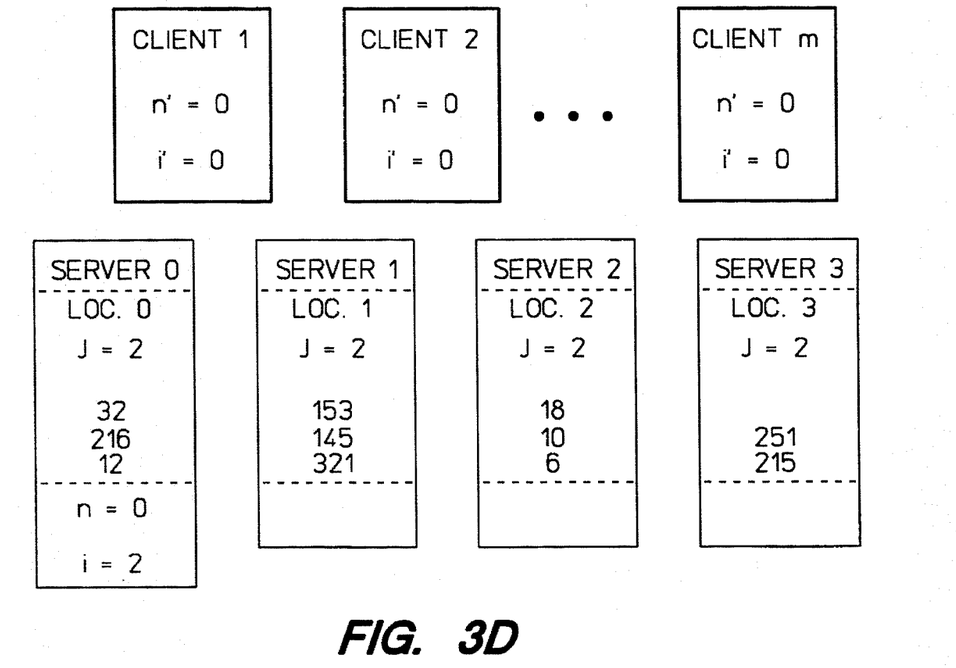

As indicated previously herein, the addressable storage space available to the database expands linearly, one memory location or "bucket" at a time. FIG. 3D shows much later exemplary evolution of the database as records are inserted by the plurality of autonomous client data processors. The autonomous clients have provided additional records having additional key values. As shown in FIG. 3D, the addressable storage space available to the data base has expanded. Whereas in FIG. 3C only one split is shown as having occurred, in FIG. 3D three splits are shown as having occurred. Accordingly, FIG. 3D shows a total of four data storage locations, each residing on a respective Server. In FIG. 3D the coordinator index value, i, is equal to 2, i=2, accurately indicating that the current total number of addressable memory locations, four memory locations, is greater than or equal to $2^2$ and is less than $2^3$.

Assume for the sake of illustration that Client I provides another record and generates a corresponding key value 7 in accordance with block 200 of the flow chart of FIG. 2. As shown in FIG. 3D, Client 1 has maintained a client pointer value equal to zero, n'=0, and a client index value equal to zero, i'=0. Accordingly, using the method of the invention discussed previously with particular reference to block 202 of the flow chart of FIG. 2, Client 1 is suitably programmed to generate a first memory address, $a_1$ using the equation:

$$a_1 = h_i = C \bmod N*2^{i'}$$

Substituting appropriate values yields:

$$a_1 = 7 \bmod 1 = 0$$

so that the first memory address is zero. In accordance with block 204 of the flow chart, Client 1 sends the key value to Server 0, which includes memory Location 0 as shown in FIG. 3D. As shown in FIG. 3D, memory Location 0 has stored a server index value equal to two, J=2. Using the method of the invention discussed previously with particular reference to block 206 of the flow chart of FIG. 2, Server 0 is suitably programmed to determine that the first address is not the correct address. Specifically, Server 0 generates a first hash value, $h_1$, using the equation:

$$h_1 = C \bmod N*2^J$$

Substituting appropriate values yields:

$$h_1 = 7 \bmod 4 = 3$$

Server 0 compares the first address, $a_1$=0 to the first hash value $h_1$=3. If the first address, $a_1$, were equal to the first hash value, then Server 0 would determine that the first address is the correct address. However, since the first address, $a_1$, is not equal to the first hash value, Server 0 determines that the first address is not the correct address.

Since the first memory address is not the correct memory address, from the key value, Server 0 generates a second memory address, $a_2$. That identifies a second memory location, as discussed previously with respect to block 208 of the flow chart of FIG. 2. The step of generating the second address by means of the server includes: making the second address, $a_2$ equal to the first hash value, $h_1$; decrementing the first server index value, J, to produce a decremented first server index value, J–1; hashing the key value using a hashing function based upon the decremented first server index value to produce a second hash value, $h_2$; and changing the second address so as to be equal to the second hash value if the second hash value is greater than the first address, and if the second hash value is less than the first hash value. The second hash value is generated by the server in accordance with the following equation:

$$h_2 = C \bmod N*2^{J-1}$$

Substituting appropriate values yields:

$$h_2 = 7 \bmod 2 = 1$$

Server 0 compares the second hash value, $h_2$=1, to the first address $a_1$=0 and compares the second hash value $h_2$=1 to the first hash value, $h_1$=3. Since the second hash value, $h_2$=1, is greater than the first address $a_1$=0, and since the second hash value, $h_2$=1, is less than the first hash value, $h_1$=3, then the server changes the second address so as to be equal to the second hash value, $a_2=h_2=1$. Even though FIG. 3D shows that in this particular case an address of three is not beyond the current address space, this process of changing the second address prevents any possibility of the address generated by the server ever being beyond the current address space.

In accordance with block 210 of the flow chart, Server 0 sends the key value to Server 1, which includes memory Location 1. As shown in FIG. 3D, memory Location 1 has stored a server index value equal to two, $J=2$. Using the method of the invention discussed previously with particular reference to block 212 of the flow chart of FIG. 2, Server 1 is suitably programmed to determine that the second address is not the correct address. Specifically, Server 1 generates a third hash value, $h_3$, using the equation:

$$h_3 = C \bmod N*2^J$$

Substituting appropriate values yields:

$$h_3 = 7 \bmod 4 = 3$$

Server 1 compares the second address, $a_2=1$ to the third hash value $h_3=3$. Since the second address, $a_2$ is not equal to the third hash value, Server 1 determines that the second address is not the correct address.

Since the second memory address is not the correct memory address, then, from the key value, Server 1 generates a third memory address, $a_3$, that identifies a third memory location, as discussed previously with respect to block 214 of the flow chart of FIG. 2. The step of generating the third address by means of the server includes: making the second address, $a_3$, equal to the third hash value, $h_3$; decrementing the second server index value, J, to produce a decremented second server index value, $J-1$; hashing the key value using a hashing function based upon the decremented second server index value to produce a fourth hash value, $h_4$; and changing the third address so as to be equal to the fourth hash value if the fourth hash value is greater than the second address, and if the fourth hash value is less than the third hash value. The fourth hash value is generated by the server in accordance with the following equation:

$$h_4 = C \bmod N*2^{J-1}$$

Substituting appropriate values yields:

$$h_4 = 7 \bmod 2 = 1$$

Server 1 compares the fourth hash value, $h_4=1$, to the second address $a_2=1$. Since the fourth hash value, $h_4=1$, is not greater than the second address $a_2=0$, the third address remains unchanged equal to the third hash value $a_3=h_3=3$. Accordingly, the third address is equal to 3 and is certain to be the correct address.

Accordingly, Server 1 then sends the key value to Server 3, which includes memory Location 3 as shown in FIG. 3D. As shown in FIG. 3D, memory Location 3 has stored a server index value equal to two, $J=2$. Server 3 is suitably programmed to verify that the third address is the correct address. Specifically, Server 3 generates a fifth hash value, $h_5$ using the equation:

$$h_5 = C \bmod N*2^J$$

Substituting appropriate values yields:

$$h_5 = 7 \bmod 4 = 3$$

Server 3 compares the third address, $a_3=3$ to the fifth hash value $h_5=3$. Since the third address, $a_3$, is equal to the fifth hash value, Server 3 verifies that the third address is the correct address. The record corresponding to the key value of seven is then stored in storage Location 3, which is included in Server 3 as shown in FIG. 3D.

Figure 3E:
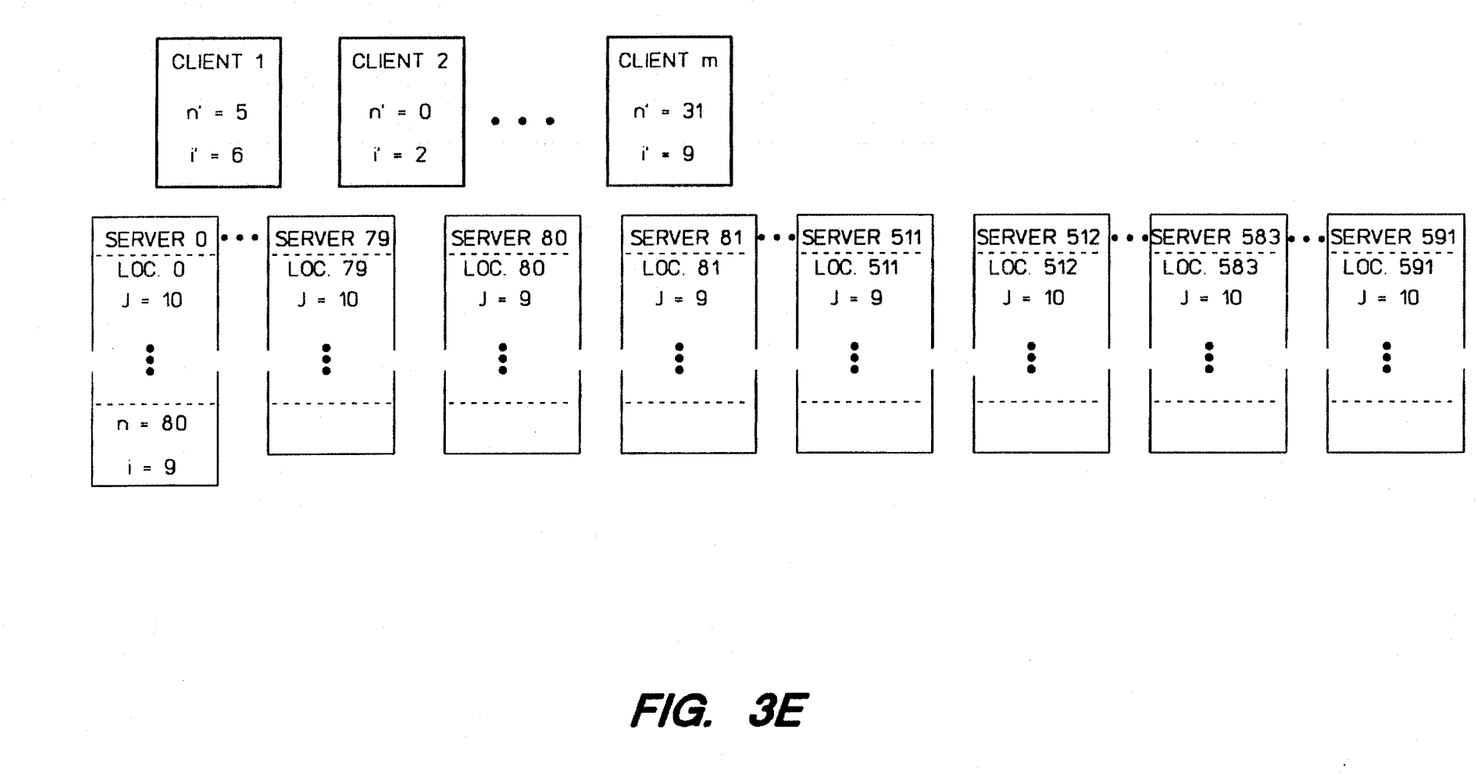

FIG. 3E shows even later evolution of the database as records are inserted by the plurality of autonomous client data processors. The autonomous clients have provided additional records having additional key values. For the sake of simplicity, key values are not shown in FIG. 3E. As shown in FIG. 3E, memory Location 79 split to produce memory Location 591. In FIG. 3E the coordinator pointer value is equal to 80, $n=80$, accurately indicating that the next memory location to be split is memory location 80. In FIG. 3E the coordinator index value is equal to 9, $i=9$, accurately indicating that the current total number of addressable memory location is greater than or equal to $2^9$ and is less than $2^{10}$. It should be noted that for each memory location having an address greater than or equal to the coordinator pointer value, $\geq n$, and less than 2 raised to an exponent of the coordinator index value, $<2^i$, a respective server index of each of the memory locations is equal to the coordinator value, $J=i$. For example, as shown in FIG. 3E, $J=i=9$ for memory locations having addresses greater than or equal to $n=80$ and less than 512, which is $2^i=2^9$. For each memory location having an address less than the coordinator pointer value, $<n$, or greater than or equal to 2 raised to an exponent of the coordinator index value, $\geq 2^i$, a respective server index of each of the memory locations is equal to the coordinator index value plus one, $i+1$. For example, as shown in FIG. 3E, $J=i+1=10$ for memory locations having addresses less than $n=80$ or greater than or equal to 512, which is $2^i=2^9$.

The accurate current total number of addressable memory locations is computed as $2^i$ plus n. Substituting values, yields $2^9+80 = 592$. As shown in FIG. 3E, the addressable storage space available to the data base has expanded to include five hundred and ninety two servers, which in aggregate provide five hundred and ninety two memory locations. For the sake of simplicity, fewer than 592 servers are shown in FIG. 3E.

As indicated previously, if any one of the clients generates an incorrect first address based upon a client index value or a client pointer value that do not accurately reflect the current true status of the memory locations, then the server determines that the first address is not the correct address in accordance with the method of the present invention as discussed previously herein with respect to the flow chart of FIG. 2. In the process referred to herein as image update, the server locally updates the client index value and the client pointer value so as to more accurately reflect the current true status of the memory locations.

In accordance with the image update process, the server compares the client index value, $i'$, to the server index value, J. As an initial process step, if the server index value is greater than the client index value, then the server locally updates the client index value to be one less than the server index value and locally updates the client pointer value to be one greater than the address of the server. As a subsequent process step, if the client pointer has become greater than or equal to two raised to a power of the client index value, then the server changes the client pointer value to be zero and changes the client index value to be equal to the one more than the client index valued. The two steps of the image adjustment process may be alternatively expressed using mathematical notation as:

1. If J>i' then i':=J−1, and n':=$a_1$+1;
2. If n'≥$2^{i'}$ then n':=0, and i':=i'+1

As shown in FIG. 3E, client pointer values and client index values of the various autonomous clients have undergone the image update process as the database has evolved. For example, Client 1 has a client pointer value of 5, n'=5, and has a client index value of 6, i'=6, which indicates that Client 1 views the addressable storage space as expanded to include only 69 memory locations, since $2^6$+5=69. As another example, Client 2 has a client pointer value of 0, n'=0, and has a client index value of 2, i'=2, which indicates that Client 2 views the addressable storage space to have expanded to include only 4 memory locations since $2^2$+0=4. As yet another example Client m has a client pointer value of 31, n'=31, and has a client index value of 9, i'=9, which indicates that Client m views the addressable storage space to have expanded to include only 542 memory locations since $2^9$+31 =4. None of these views is accurate since the addressable storage space has currently expanded to 592 memory locations, as discussed previously. A helpful insight is that incorrect client index or pointer values are always less than corresponding correct coordinator index or pointer values. The method of the present invention still generates a respective correct address from each of the key values generated by the clients, despite the inaccuracies of these client views.

Figure 4:
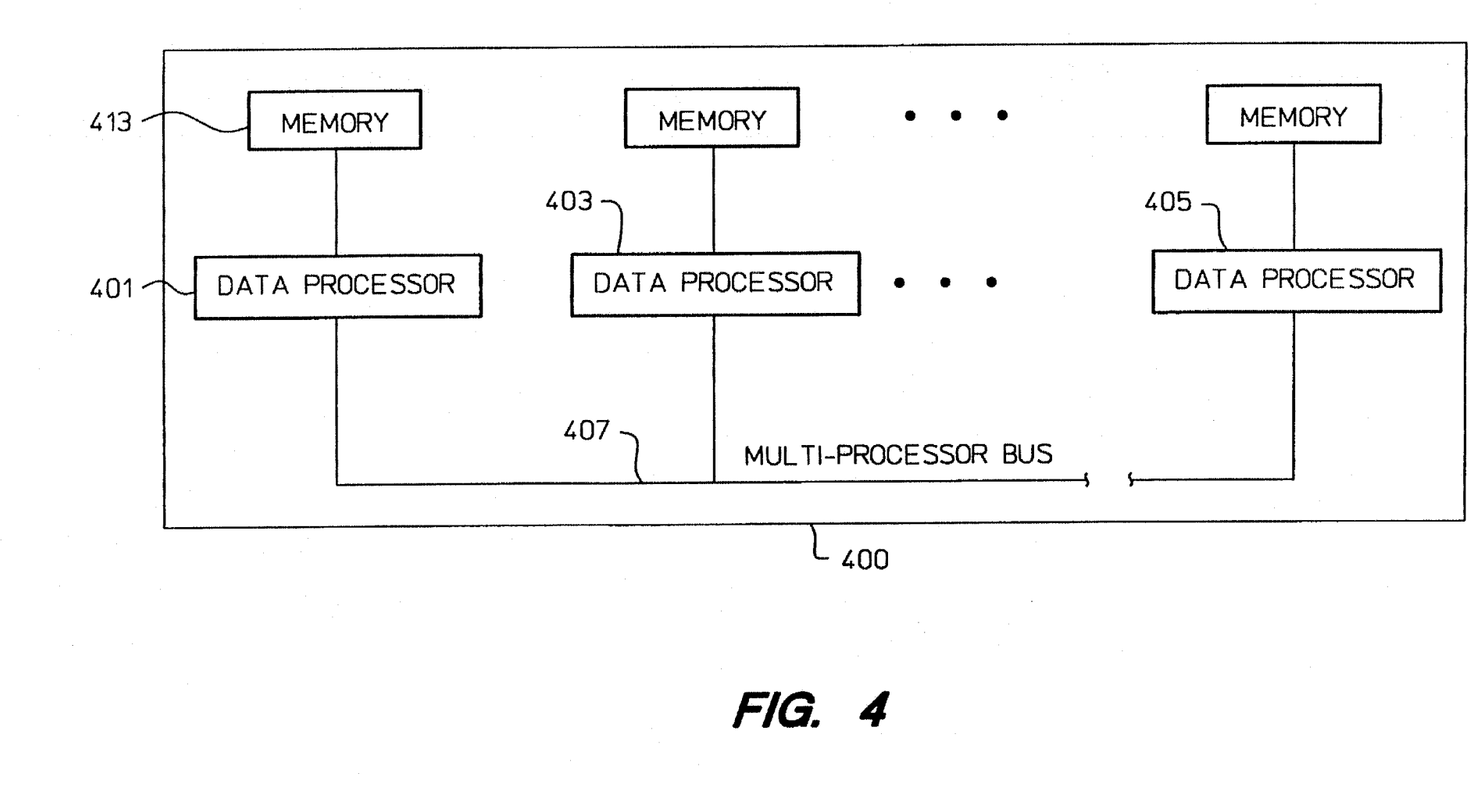
FIG. 4 is a simplified block diagram of a multiprocessing system of an alternative embodiment of the apparatus of the present invention.

An alternative embodiment of the present invention is used in conjunction with a multiprocessing system. The multiprocessing system is a computer system having a plurality of proximately coupled data processors wherein more than one of the processors may be active at any one time. FIG. 4 is a simplified block diagram of the multiprocessing system 400 of the alternative embodiment of the present invention. It should be understood that in the multiprocessing system includes a large number of data processors, however only three data processors 401,403, 405, are shown in FIG. 4 for the sake of simplicity. The data processors are proximately coupled by a multiprocessor bus 407, to provide high speed data communication between the data processors. The high speed data communications of the multiprocessor bus provides some advantages that are similar to those discussed previously herein with respect to the high speed data communications of the computer network.

A first one of the data processors 409, preferably a microprocessor, is coupled to a memory 413, preferably including random access memory, RAM. As shown in FIG. 4, remaining data processors 403, 405 are also coupled to memories, arranged in a similar manner as those discussed with respect to the first data processor. An aggregate amount of RAM in all the memories of the multiprocessing system is preferably gigabytes in size. Data is distributed to reside in RAM records in any of the memories of the multiprocessing system, providing some advantages that are similar to discussed previously with respect to the computer network.

The alternative embodiment also provides additional advantages by employing parallel processing. Parallel processing uses concurrency in the operation of the multiprocessing system to increase throughput. While the processors are actively executing separate processes, they run asynchronously, each accessing a respective memory coupled thereto.

The present invention provides a flexible and efficient data processing method and apparatus, which generate a correct memory address from a character or digit string such as a record key value, and which is adapted for use in distributed or parallel processing architectures such as computer networks, multiprocessing systems, anti the like. The present invention provides fast storage and subsequent searching and retrieval of data records in data processing applications such as database applications. Although specific embodiments of the invention have been described and illustrated, the invention is not to be limited to the specific forms or arrangements of parts so described and illustrated, and various modifications and changes can be made without departing from the scope and spirit of the invention. Within the scope of the appended claims, therefore, the invention may be practiced otherwise than as specifically described and illustrated.

What is claimed is:

1. A data processing method for generating a correct memory address from a record key value comprising the steps of:

providing a plurality of client data processors and a plurality of file servers, each server including at least a respective one memory location;

generating the key value by means of any one of the client data processors;

generating a first memory address from the key value, the first address identifying a first memory location;

selecting from the plurality of servers a server that includes the first memory location;

transmitting the key value from the one client to the server that includes the first memory location;

determining whether the first address is the correct address by means of the server; and further comprising the following steps if the first address is not the correct address:

generating a second memory address from the key value by means of the server, the second address identifying a second memory location;

selecting from the plurality of servers another server, which includes the second memory location;

transmitting the key value from the server that includes the first memory location to the other server, which includes the second memory location;

determining whether the second address is the correct address by means of the other server; and generating a third memory address, which is the correct address, if neither one of the first or second addresses is the correct address.

2. A method as in claim 1 wherein the step of generating the first address includes:

retrieving a client index value stored in a client memory coupled to the one client data processor;

hashing the key value using a hashing function based upon the client index value so as to produce the first address;

retrieving a pointer value stored in the client memory;

comparing the pointer value to the first address so as to determine whether the first address is less than the client pointer value; and further includes the following steps if the first memory address is less the client pointer value;

hashing the key value using a hashing function based upon the client index value increased by one, so as to produce an alternative hash value; and changing the first memory address so as to be equal to the alternative hash value.

3. A method as in claim 1 wherein the step of determining whether the first address is the correct address includes:

retrieving a first server index value from the first memory location;

hashing the key value using a hashing function based upon the first server index value to produce a first hash value; and comparing the first address to the first hash value to determine whether the first address is the correct address.

4. A method as in claim 3 wherein the step of generating the second address by means of the server includes:

making the second address equal to the first hash value;

hashing the key value using a hashing function based upon the first server index value reduced by one, to produce a second hash value; and changing the second address so as to be equal to the second hash value if the second hash value is greater than the first address, and if the second hash value is less than the first hash value.

5. A method as in claim 1 wherein the step of determining whether the second memory address is the correct address by means of the other server includes:

retrieving a second server index value from the second memory location;

hashing the key value using a hashing function based upon the second server index value to produce a third hash value; and comparing the second address to the third hash value to determine whether the second address is the correct address.

6. A method as in claim 5 wherein the step of generating the third memory address includes:

making the third address equal to the third hash value;

hashing the key value using a hashing function based upon the second server index value reduced by one, to produce a fourth hash value; and changing the third address so as to be equal to the fourth hash value if the fourth hash value is greater than the second address, and if the fourth hash value is less than the third hash value.

7. A data processing method for storing a record having a record key value comprising the steps of:

generating the correct address using the method of claim 1; and storing the record at a storage location identified by the correct address.

8. A data processing apparatus for generating a correct address from a record key value comprising:

a client data processor;

a plurality of file servers, each server including at least a respective one memory location;

means coupled with the client data processor for generating the key value;

means coupled with the client data processor for generating a first memory address from the key value, the first address identifying a first memory location;

means coupled with the client data processor for selecting from the plurality of servers a file server that includes the first memory location;

means coupled with the client data processor and the server for transmitting the key value from the client to the server that includes the first memory location;

means coupled with the server for determining whether the first address is the correct address; and means coupled with the server for generating a second memory address if the first address is not the correct address, the second address identifying a second memory location;

means coupled with the server for selecting from the plurality of servers another file server, which includes the second memory location;

means coupled with the server and the other server for transmitting the key value from the server to the other server;

means coupled with the other server for determining whether the second address is the correct address; and means coupled to the other server for generating a third memory address, which is the correct address, if neither one of the first or second addresses is the correct address.

9. An apparatus as in claim 8 wherein the means for determining whether the first address is the correct address includes:

means coupled with the server for retrieving a first server index value from the first memory location;

means coupled with the server for hashing the key value using a hashing function based upon the first server index value to produce a first hash value; and means coupled with the server for comparing the first address to the first hash value to determine whether the first address is the correct address.

10. An apparatus as in claim 9 wherein the step of generating the second address includes:

means coupled with the server for making the second address equal to the first hash value;

means coupled with the server for hashing the key value using a hashing function based upon the first server index value reduced by one, to produce a second hash value; and means coupled with the server for changing the second address so as to be equal to the second hash value if the second hash value is greater than the first address, and if the second hash value is less than the first hash value.

* * * * *